July 23, 1940.   H. L. PEPPER   2,209,001
ENGINE MOUNTING FOR AUTOMOBILES
Filed April 24, 1939   3 Sheets-Sheet 1
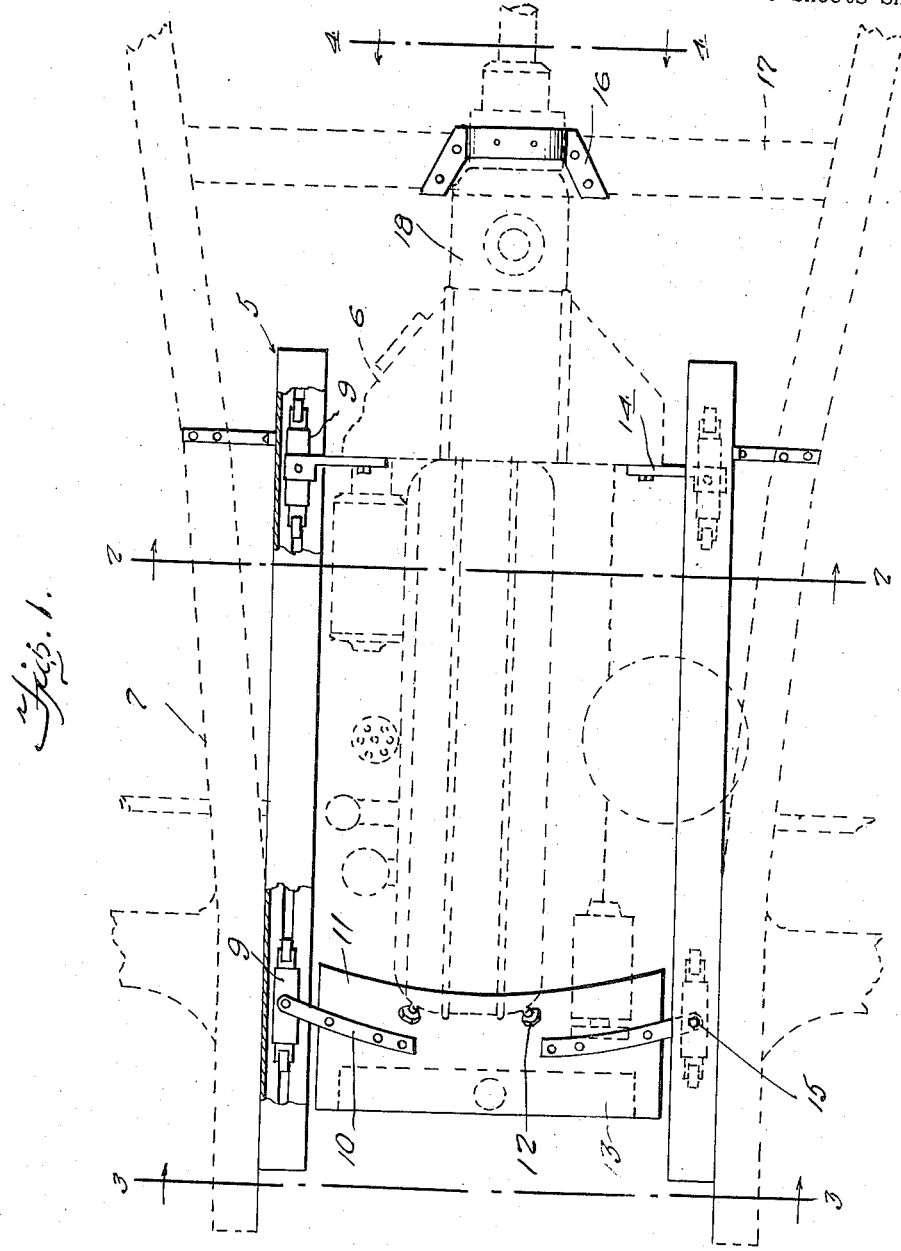
Inventor
H. L. Pepper
By Clarence A. O'Brien
and Hyman Berman
Attorneys July 23, 1940.  H. L. PEPPER  2,209,001
ENGINE MOUNTING FOR AUTOMOBILES
Filed April 24, 1939  3 Sheets-Sheet 2
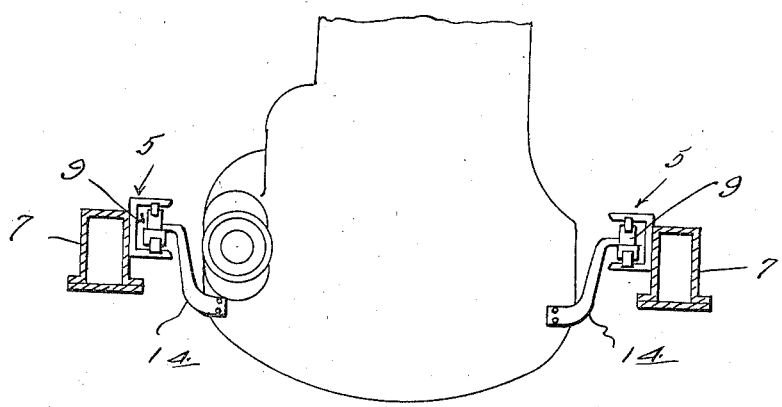
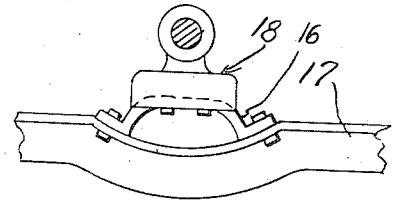
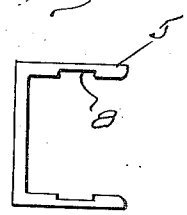
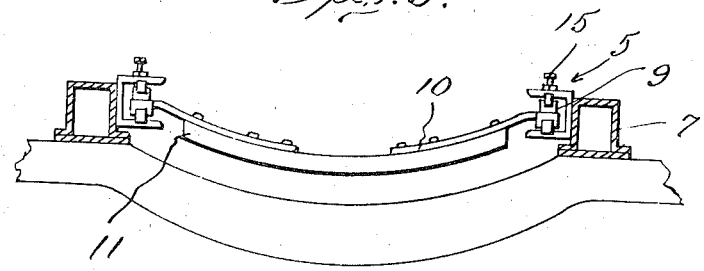
Inventor
H. L. Pepper
By Clarence A. O'Brien
and Hyman Berman
Attorneys July 23, 1940.  H. L. PEPPER  2,209,001
ENGINE MOUNTING FOR AUTOMOBILES
Filed April 24, 1939    3 Sheets-Sheet 3

Inventor
H. L. Pepper

By Clarence A. O'Brien
and Hyman Berman
Attorneys

Patented July 23, 1940

2,209,001

UNITED STATES PATENT OFFICE 2,209,001

ENGINE MOUNTING FOR AUTOMOBILES

Henry L. Pepper, New Orleans, La.

Application April 24, 1939, Serial No. 269,766

2 Claims. (Cl. 180—64)

This invention relates to engine mountings for automobiles, and has for the primary object the provision of a device of this character which may be readily adapted to an automobile as now constructed for removably mounting the engine and companion units thereto so that the engine may be readily slid from the chassis frame of the automobile and supported free thereof to permit repairs, adjustments and tests to be easily and quickly carried out on the engine with the least expenditure of manual labor and normally provide cushion supports for the engine in the automobile chassis for absorbing and checking engine vibration and preventing the vibration from reaching the automobile frame and body.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a fragmentary top plan view partly in section illustrating an engine mounting for an automobile constructed in accordance with my invention and showing a portion of the chassis frame and the engine and associated units in dotted lines.

Figure 2 is a transverse sectional view taken on the line 2—2 of Figure 1.

Figure 3 is a transverse sectional view taken on the line 3—3 of Figure 1.

Figure 4 is a transverse sectional view taken on the line 4—4 of Figure 1.

Figure 5 is an end view illustrating one of the track elements.

Figure 6:
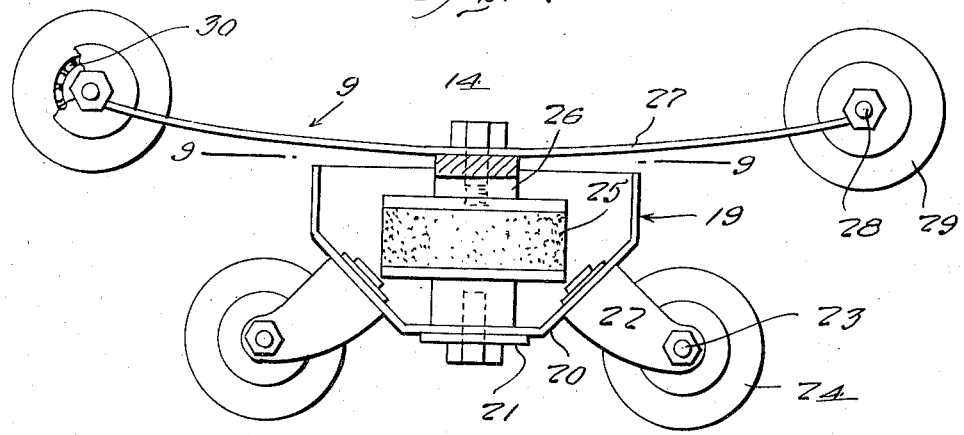
Figure 6 is a side elevation illustrating one of the carriages employed in the construction of the engine mounting.
Figure 7:
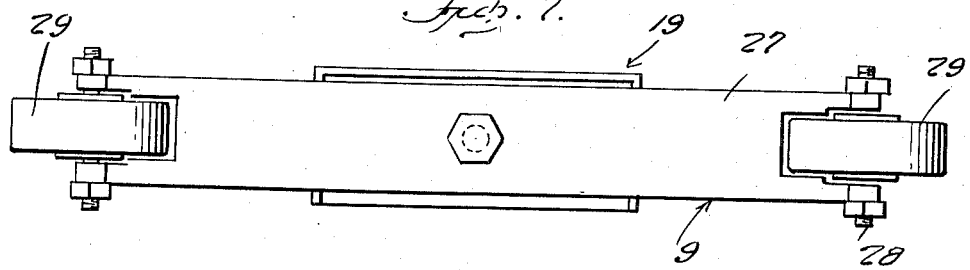
Figure 7 is a top plan view illustrating the carriage.
Figure 8:
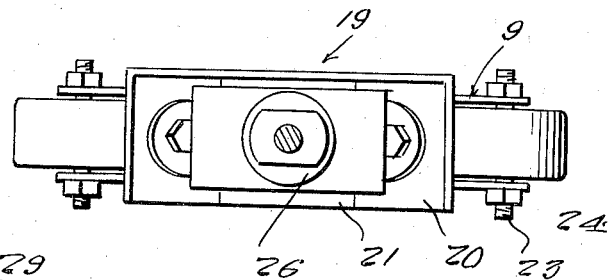
Figure 8 is an end elevation illustrating the carriage.
Figure 9:
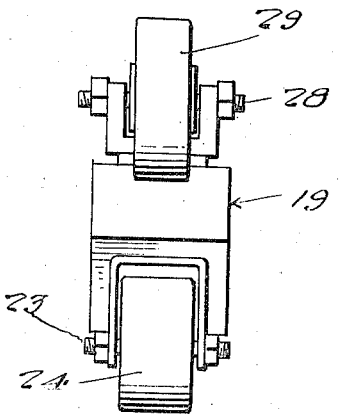
Figure 9 is a sectional view taken on the line 9—9 of Figure 6.

Referring in detail to the drawings, the numeral 5 indicates parallel track elements adapted to be arranged at opposite sides of an automobile engine, indicated by the character 6, and secured on side members of the chassis frame 7 of the automobile. The track elements 5 are of channel iron construction, the upper and lower walls thereof being provided with grooves 8 in which rollers of carriages operate. The carriages are indicated in entirety by the character 9 and are arranged in opposed pairs for supporting the front and rear ends of the engine 6. The front pair of carriages 9 have secured thereto arms 10 on which is mounted a hanger plate 11 that provides a support for the front end of the engine, the latter being secured thereto, as shown at 12, and also a support for the radiator 13 of the engine. Motor arms 14 suitably secured on opposite sides of the engine adjacent the rear end thereof are secured on the rear pair of carriages. The track elements are equipped with set screws 15 which may be turned in engagement with the carriages for locking the latter against sliding movement in the track elements to prevent displacement of the engine under normal operations within the automobile. Also, the grooves in the track elements receiving the rollers of the carriages tend to maintain the engine in proper alignment within the chassis frame of the automobile.

A bracket 16 is secured to a cross member 17 of the chassis frame for supporting the rear end of the transmission 18 of the engine. The bracket 16 is detachably secured to the transmission housing 18, as shown in Figure 4.

Each carriage 9 consists of a cup-shaped body one side of which is fully open as also the top thereof. The bottom wall of the body includes diverging portions 20 and a horizontal portion 21. The diverging portions 20 have secured thereto forked members 22 carrying axles 23 on which are journaled rollers 24. The rollers 24 are adapted to ride the lower wall of the track elements. Removably mounted on the horizontal portion 21 of the rear carriages is a cushion block 25 while the front carriages are provided with metallic blocks. The cushion block 25 includes a bearing portion 26 on which a spring arm 27 is secured. The spring arm is equipped at the ends thereof with axles 28 on which are journaled upper rollers 29. The spring arm 27 has an arcuate curvature thereto and yieldably supports the upper rollers 29 against the upper wall of the track elements. The rollers 24 and 29 are equipped with anti-friction bearings, as indicated at 30.

The motor arms 10 and 14 are secured to the bearing portions 26 of the carriages. From this construction it will be seen that the rear end of the motor or engine is cushioningly supported due to the use of the cushion blocks 25 in the rear carriages. Of course, if it is found desirable to cushion the front end of the engine, the front carriages may be equipped with cushion blocks.

When the carriages are located within the track elements the spring arms are under tension maintaining the upper and lower rollers in engagement with the grooves in the upper and lower walls of the track elements. Thus it will be seen that when the stud bolts are released from the carriages and the engine uncoupled from the propeller shaft in the usual way, the engine may be slid forwardly off the chassis frame.

It is believed that the foregoing description, when taken in connection with the drawings, will fully set forth the construction and advantages of this invention to those skilled in the art to which such a device relates, so that further detailed description will not be required.

Having described the invention, I claim:

1. In a device of the character set forth, channeled track elements arranged at opposite sides of an engine of an automobile and secured on the latter and each having in opposed walls thereof grooves, carriages including rollers engaging in said grooves, hangers carried by said carriages and secured on opposite sides of the engine, securing means carried by the track elements to engage the carriages, each of said carriages including a body portion, lower rollers journaled on said body portion, a block carried by said body portion, a motor hanger secured on said block, a spring arm secured on said block, and upper rollers journaled on the ends of the spring arm.

2. In a device of the character set forth, channeled track elements arranged at opposite sides of an engine of an automobile and secured on the latter and each having in opposed walls thereof grooves, carriages including rollers engaging in said grooves, hangers carried by said carriages and secured on opposite sides of the engine, securing means carried by the track elements to engage the carriages, each of said carriages including a body portion, lower rollers journaled on said body portion, a block carried by said body portion, a motor hanger secured on said block, a spring arm secured on said block, and upper rollers journaled on the ends of the spring arms, the blocks of certain of said carriages being constructed of cushion material.

HENRY L. PEPPER.